United States Patent [19]

Sanner et al.

[11] Patent Number: 4,845,712
[45] Date of Patent: Jul. 4, 1989

[54] STATE MACHINE CHECKER

[75] Inventors: Martin W. Sanner; Seema Chandra, both of San Jose, Calif.

[73] Assignee: Tandem Computers Incorporated, Cupertino, Calif.

[21] Appl. No.: 126,525

[22] Filed: Nov. 30, 1987

[51] Int. Cl.⁴ .............................................. G06F 11/00
[52] U.S. Cl. ......................................... 371/25; 364/200
[58] Field of Search ................ 371/15, 16, 22, 20, 371/23, 25, 67, 68; 364/200, 900, 739

[56] References Cited

U.S. PATENT DOCUMENTS

| 3,457,550 | 7/1969 | Gibson | 371/25 |
| 3,812,426 | 5/1974 | Jllian | 371/25 |
| 4,055,801 | 10/1977 | Pike | 371/215 |
| 4,071,704 | 1/1978 | Mood | 371/22 |
| 4,125,763 | 11/1978 | Drabing | 371/25 |
| 4,139,147 | 2/1979 | Franke | 371/25 |
| 4,161,276 | 7/1979 | Sacher | 371/25 |
| 4,176,780 | 12/1979 | Sacher | 371/25 |
| 4,317,200 | 2/1982 | Wakatsuki | 371/25 |
| 4,351,059 | 9/1982 | Gregoire | 371/22 |
| 4,556,976 | 12/1985 | Howarth | 371/25 |

OTHER PUBLICATIONS

Falk, Howard, "Emulators Keep Pace With Chip Speeds and Complexity", Computer Design, May 15, 1987, pp. 31-38.
Walsh, Steve, "Board Testers Mimic CPU for Improved Results", Computer Design, May 15, 1987, pp. 81-84.

Primary Examiner—Michael R. Fleming
Attorney, Agent, or Firm—Townsend and Townsend

[57] ABSTRACT

Checking method and apparatus for monitoring the proper operation of a state machine of the type operable to produce control signals that in turn, cause other digital apparatus to produce responsive signals. Part of the checker apparatus, in effect, emulates the digital apparatus, receiving the control signals to produce therefrom emulated response signals that, when compared to the control signals, provide an indication of correct operation of the state machine means and associated circuitry.

8 Claims, 2 Drawing Sheets

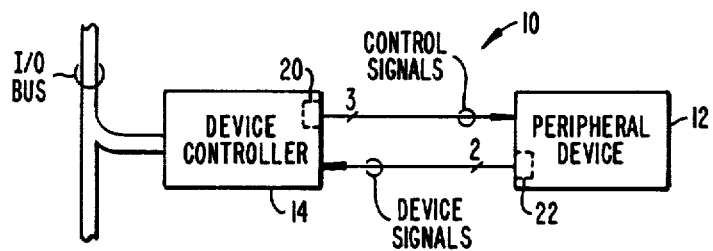
FIG._1.
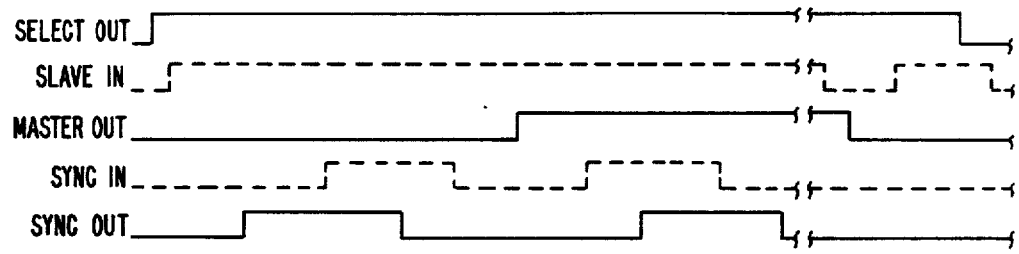
FIG._2.
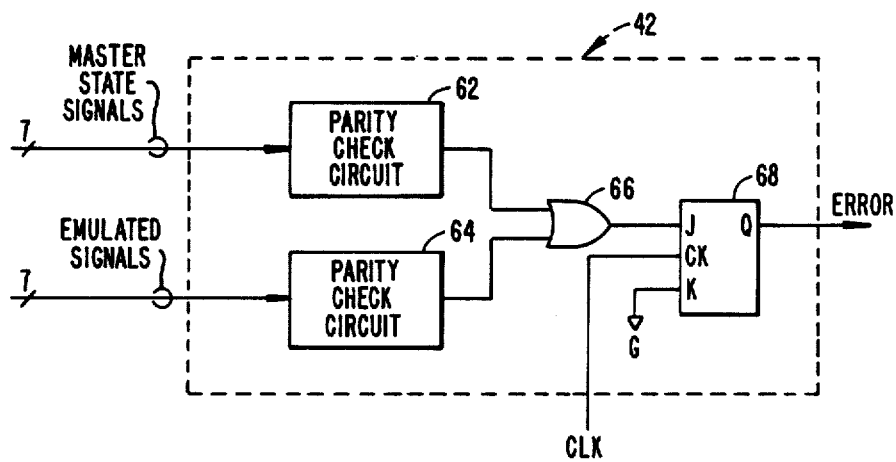
FIG._5.

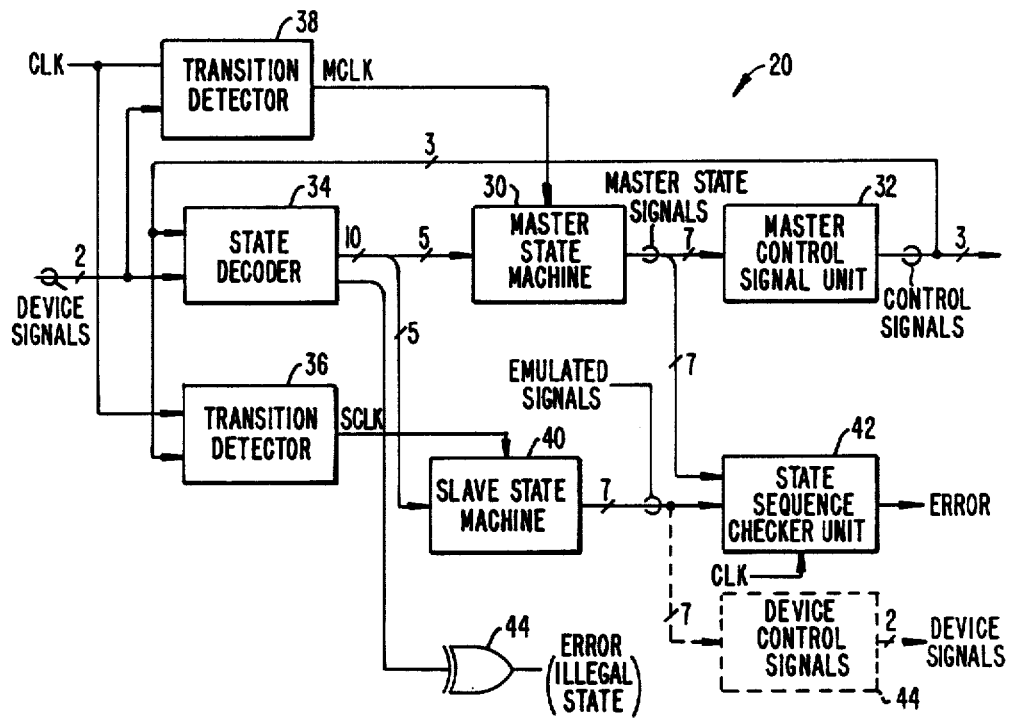
FIG._3.
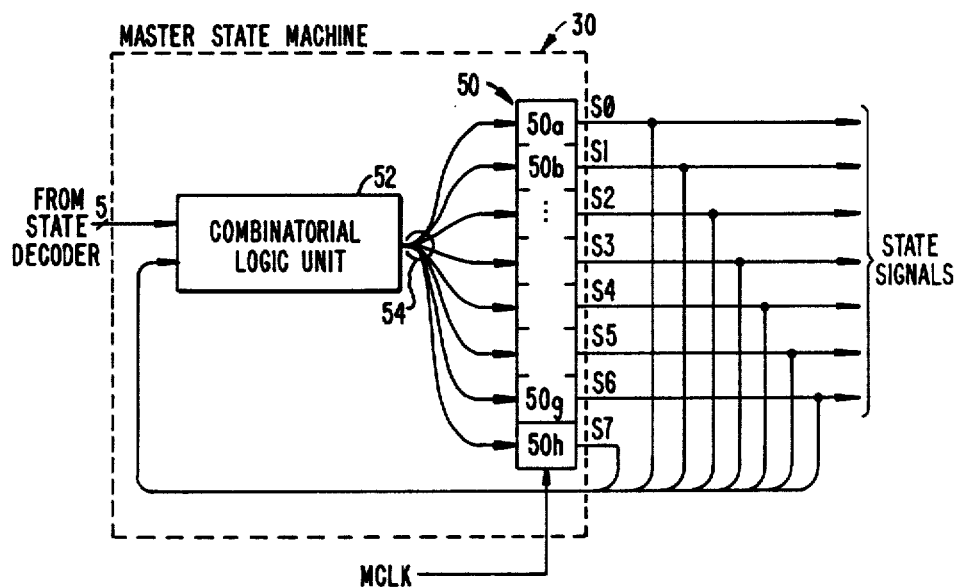
FIG._4.

STATE MACHINE CHECKER

BACKGROUND OF THE INVENTION

The present invention relates generally to data processing systems, and more particularly to a method, and apparatus for implementing that method, of monitoring the proper operation of a state machine of the type operable to sequence through a number of predetermined states, producing control signals for controlling various operations of other portions of the data processing system.

In many of today's data processing systems there is a need to permit certain portions or subsystems of the system to operate autonomously. One technique for fulfilling this need is to provide the subsystem with programmable control in the form of, for example, a microprocessor and associated support structure (e.g., memory). Often, it is necessary for two such subsystems to communicate with one another such as, for example, when transmitting data from one to the other. Such communication, often called "handshaking," will direct operation of one or the other of the subsystems, depending upon the handshake signals.

An example may be found in the input/output (I/O) system as of the data processing system, in which intelligent subsystems are often used to control data transfers between various units of the I/O system. For example, a typical I/O system will have one or more peripheral devices controlled by a device controlled that responds to instructions from a central processor unit (CPU) of the data processing system to initiate and control data transfers between the CPU and a selected one of the peripheral devices. Data is usually transferred in a bit parallel, byte (or word) series fashion between the peripheral device and the device controller during such a transfer. The transfers are controlled by handshaking between the device controller and the peripheral device associated therewith. Such handshaking can be generated by microprocessor systems.

However, when speed is a consideration, a microprocessor system may not be capable of meeting the demand. An alternative is available: Special state machines can be designed to perform the handshake-generating operations necessary, at the required speeds.

For the purposes of the description of the present invention, it will be understood that a state machine, which can be implemented in one of any of a number of presently known configurations, is of the type that is operable to each of a number of two predetermined digital states. The assumption of each digital state is dictated by the immediately prior digital state and the state of any event signal that may be also applied to direct operation of the state machine. An example of the use of state machines in a digital processing system for issuing memory commands can be found in U.S. Pat. No. 4,672,609.

SUMMARY OF THE INVENTION

The present invention provides a method, and discloses apparatus for implementing that method, of checking for proper operation of a state machine to ensure that it assumes the proper states, in the proper order, and issues the proper signals. The state machine being checked by the invention is of the type that generates control signals, receiving in return response signals (the control and response signals forming the handshake activity referred to above), in performing various operations. For purposes of the description of the invention, the state machine being checked will be referred to as the "master" or "checked" state machine. The state machine that operates in response to the control signals produced by the master state machine will be referred to as the "slave" state machine.

Broadly, the method of the present invention comprises the steps of emulating the slave state machine to sequence through a variety of states in response to the control signals generated by the master state machine; checking each assumed emulated state to determine if the emulated state is correct; and generating an error signal in thee event of incorrect operation. In addition, each state assumed by the master state machine is checked to ensure its correctness.

Associated with each master state machine is a checker state machine constructed to emulate the salve state machine with which the master state machine communicates. The checker state machine receives the control signals generated by the monitored master state machine, and responds by sequencing through the same states as the slave state machine with which the master state machine communicates. Signaling representing the states assumed by the master and checker state machines are coupled to a compare circuit where a determination is made as to whether the then-assumed states of both the master state machine and the emulated slave state machine are correct. If not, an error signal is generated.

A number of advantages are achieved by the present invention. First, the method, and the apparatus implementing that method, provide a check to ensure proper operation of a state machine and its associated circuitry.

Further, since the emulator state machine can be configured to be identical to that with which the master state machine communicates, and both manufactured in modular form, one can use the module either as a master state machine (by using the master control signals generated by the master state machine), or as a slave state machine (in which case the slave signals would be used). And, regardless of how used, the checking of the master state machine can still be made.

These and other advantages of the present invention will become apparent to those skilled in this art upon a reading of the following detailed description, which should be taken in conjunction with the accompanying drawings.

BRIEF DESCRIPTION OF THE DRAWINGS

FIG. 1 illustrates use of master-slave state machines in a device controller and an associated peripheral device, forming part of a data processing system;

FIG. 2 is a representative timing diagram illustrating control signals and responsive device signals produced by the state machines contained in the device controller and peripheral device, respectively, of FIG. 1;

FIG. 3 is a block diagram of the control unit containing the master state machine being checked as used in the device controller of FIG. 1, and showing an associated emulation of the slave state machine to monitor proper operation of the master state machine;

FIG. 4 is a block diagram of the construction of the state machine used either as a master state machine or a slave (checker) state machine; and FIG. 5 is a diagram of the state sequence checker use din FIG. 3 to check the states assumed by the master state machine and the emulated slave state machine.

DETAILED DESCRIPTION OF THE INVENTION

As indicated above, the present invention is used in conjunction with one, or another, or both, state machines configured as a state machine "couple" to communicate with one another for cooperatively performing various operations. An example of one such operation might be the cooperative control of the transfer of data between a peripheral device and a central processing unit (CPU) of a data processing system. It is this type of cooperative control performed by the interaction between two state machines (one the master, producing control signals that are responded to by the slave state machine) that forms the environment for the present invention.

Turning now to FIG. 1, a part of an input/ output (I/O) section of a data processing system is illustrated. The I/O section, designated generally with the reference numeral 10, includes an I/O bus constructed to connect a CPU (not shown) to a peripheral device 12 via a device controller 14. In operation, the device controller 14 is configured to receive instructions communicated on the I/O bus from the CPU (not shown) requesting, for example, status information of the peripheral device 12, or a data transfer either to or from the peripheral device. The device controller 14, in turn, will communicate with the peripheral device 12 by issuing control signals, to which the peripheral device 12 responds with the device signals. The CONTROL SIGNAL - DEVICE SIGNAL interchange (typically referred to as "handshaking") will continue until the operation initiated by the device controller 14 is completed - be it a data transfer, or merely a check of the status of the peripheral device 12. Not shown, for reasons of clarity, is the bus structure that connects the device controller 14 to the peripheral device 12 for conducting data therebetween.

The signaling between the device controller 14 and peripheral device 12 may be initiated by either unit, depending upon the particular operation to be performed. The signals are generated by control units 20, 22, contained in the device controller 14 and peripheral device 12, respectively. The control unit 20 operates to generate three CONTROL SIGNALS, illustrated in FIG. 2 as SELECT OUT, MASTER OUT and SYNC OUT and the (slave) control unit 22 responds to the CONTROL SIGNALS with the DEVICE SIGNALS the comprise, as also illustrated in FIG. 2, in phantom, SLAVE In and SYNC IN signals.

A typical colloquy between the state machines 20, 22 may be to control the transfer of data from the peripheral device 12 to the I/O BUS through the device controller 14. The peripheral device 12 is first selected by assertion (i.e., brought HIGH) of the SELECT OUT signal in FIG. 2. The peripheral device 12, or more accurately the slave control unit 22 contained in the peripheral device 12, signifies recognition of the selection by asserting the SLAVE IN signal.

An instruction is placed on the data bus (not shown) connecting the device controller 14 to the peripheral device 12, and SYNC OUT signal asserted. The slave control unit 22 responds by asserting momentarily the SYNC IN signal, signaling receipt of the instruction. If the instruction was one requesting data from the peripheral device, the instruction would thereafter be followed by assertion of the MASTER OUT signal. Thereafter, data is placed on the bus (not shown) connecting the device controller 14 and the peripheral device 12 and the SYNC In signal asserted by the slave control unit 22 to signify that the data is then present and stable. The master control unit 20 responds by momentarily asserting the SYNC OUT signal in response to each assertion of SYNC IN, signaling that the data has been accepted.

The SYNC IN, SYNC OUT handshakes continue for each piece of data transferred. When all the data has been transferred, the slave control unit 22 signals this by dropping (deasserting) the SLAVE IN signal. The master control unit 20 responds by dropping the MASTER OUT signal, which the slave control unit acknowledges by asserting the SLAVE IN signal. In turn, the master control unit 20 responds by dropping SELECT OUT, and the slave control unit responds by dropping SLAVE IN.

The particular protocol used to transfer data between the device controller 14 and the peripheral device 12 is not important. Any protocol can be used. what FIG. 2 is meant to illustrate, however, is that the respective control units 20 and 22 contained in the device controller 14 and peripheral device 12 function as a couple, cooperatively responding to the signaling produced by the other.

Turning now to FIG. 3, the control unit 20 used in the device controller 14 (FIG. 1) to generate the CONTROL SIGNALS is illustrated, As FIG. 3 shows, the control unit 20 includes a master state machine 30 operable to generate master state signals that are communicated to a master control signal logic circuit 32 that produces, from the master state signals, the CONTROL SIGNALS that are communicated to the peripheral device 12. The CONTROL SIGNALS are coupled back and applied to a state decoder 34, which also receives the DEVICE SIGNALS produced by the peripheral device 12. The CONTROL SIGNALS are also applied to a transition detector 36, and the DEVICE SIGNALS are also applied to a transition detector 38, both transition detectors 36, 38 receiving a system clock (CLK) signal.

As indicated above, the DEVICE SIGNALS that are received by the state decoder 34 are produced by a slave state machine (not shown), and associated circuitry, contained in the device controlled by the device controller 14. A substantially identical (slave) state machine 40 is constructed to be associated with the (master) state machine 30, in effect operating to emulate the slave state machine (not shown) that forms the heart of the slave control unit 22 of the peripheral device 12. The emulating slave state machine 40 receives signaling from the state decoder 34 that causes it to assume those same states that are assumed by the state machine of the slave control unit 22. The output of the slave state machine 40 is applied to a state sequence checker unit 42, as is the output of the master state machine 30. The state sequence checker 42 checks the outputs in a manner that determines whether or not each individual state assumed by the two state machines 30 and 40 are correct; if not, the state sequence checker 42 issues an ERROR signal indicating a problem.

Before commencing a discussion of the operation of the circuit illustrated in FIG. 3, it will be beneficial to the reader to known and understand the architecture of the state machines used in connection with the present invention. Thus, referring to FIG. 4, there is illustrated the architecture of the master state machine 30. The architecture of the (slave) state machine 40 is substantially identical, so that a discussion of the FIG. 4 diagram will be understood as applying to either of the state machines 30, 40.

As FIG. 4 illustrates, the state machine 30 includes an eight-stage state register 50 that receives, at each of the data inputs of the individual stages (50a, ..., 50h), output signals formed by ac combinatorial logic unit 52. The outputs (S0, S2, ..., S6) from only seven of the stages (50a, ..., 50g) of the state register 50 are used to form the state signals that are applied to the master control signal unit 32 (FIG. 3) and the state sequence checker unit 42. The outputs S0, ..., S7 of all eight stages 50a, ..., 50h are coupled back and applied inputs to the combinatorial logic unit 52, as are the five output signals produced by the 5-to-N state decoder 34. The combinatorial logic unit 52 operates to form signaling on the output lines 54 therefrom indicative of the next state to be assumed by the master state machine 30. It is clocked into the state register 50 by the system MCLK signal (the slave state machine receives SCLK) produced by the transition detector 38 (FIG. 3).

There are eight states assumable by the master state machine 30 (or the slave state machine 40). Each state is represented by a ONE or HIGH in one and only one of the stages 50a, ..., 50h, with the other stages containing a ZERO or LOW. Thus, at any one moment of operation time, only one of the state signals appearing at the outputs S0, ..., S6 will have a ONE. The eighth state, a WAIT state, is represented by a ONE in the stage 50h of the state register 50.

In operation, the master state machine will cycle through various of its eight legally assumable states, depending upon the operation to be performed, and as it assumes each individual state the output lines S0, ..., S6 are applied to the master control signal unit 32, a combinatorial logic formation, producing the CONTROL SIGNALS that are communicated to the peripheral device 12 (FIG. 1). Depending upon the particular state the master state machine 30 assumes, and the sequence of states it has traversed through to assume that state, the control unit 22 of the peripheral device 12 will also sequence through various states to produce the DEVICE SIGNALS that are communicated back to the device controller 14 and applied to the state decoder unit 34. State changes of the DEVICE SIGNALS are detected by the transition detector 38 of conventional design, producing an MCLK pulse each transition from one state to another. The MCLK pulse is, as indicated in FIG. 4, applied to the state register 50.

Operation of the slave state machine 40, as hereinbefore indicated, is essentially the same except that it changes state with each change in the CONTROL SIGNALS (detected by the transition detector 36 that produce the SCLK signal to effect state changes - if any).

Thus, the next state to be assumed by the master state machine 30 is developed by the state decoder 34, as described above. The master state machine is placed in this next state, however, only when the peripheral device 12 responds to the most recent CONTROL SIGNAL produced by the master state machine 30. Thus, when the peripheral device 12 does respond, indicated by a state change in the DEVICE SIGNALS, the change will be detected by the transition detector 32, creating an MCLK pulse that will load the state register 50 with the newly-developed state. This cooperative action and response activity continues as long as is necessary to complete whatever operation was started.

As indicated above, the salve state machine 40, in effect "emulates" the state machine (not shown) contained in the control unit 22 of the peripheral device 12. Thus, for each state change made by the master state machine 30 there may be an answering state change in the state machine (not shown) operating the peripheral device 12, and the slave state machine 40 also changes. The output from the state register 50 contained in the salve state machine 40 will be identical to that of the state machine forming the control unit 22 in the peripheral device 12.

As noted above, any one state of the master or slave state machines 30, 40 is represented by a single ONE being asserted on one of the output lines S0, ..., S6. Checking becomes a simple matter of determining whether the master or the slave state machines have assumed an illegal state (i.e., something other than a single ONE). This is the principle upon which the state sequence checker unit 42 is structured: A parity check is made on the outputs of the state machines 30, 40.

This is illustrated in FIG. 5, which shows the structure of the state sequence checker 42. The master and emulated state signals produced by the master and emulating slave state machines are respectively applied to parity check circuits 42. Each of the parity check circuits are structured to check for odd parity; andy noted parity error is communicated by an OR gate to the J input of a J/K flip-flop 68 that is clocked by the system clock CLK. The K input of the J/K flip-flop 68 is tied to ground G, configuring the J/K flip-flop as a latch.

As the master and emulated slave flip-flops 30, 40 assume each state, that state is checked by the parity checkers 62, 64. Thus, insofar as the master state machine 30 is concerned, not only is the legality of each state assumed checked, but the circuitry associated with the master state machine is checked through the medium of the emulated slave state machines 40, and the check performed on the state machine.

A further advantage of the present invention is obtained if the circuit illustrated in FIG. 3 is developed in modular form. Included in the circuit would be a device control signal unit 44 (shown in phantom in FIG. 3) which develops the DEVICE SIGNALS from the state signals produced by the slave state machine 40. So constructed, the control unit 20 would be used in either the device controller, in which case the CONTROL SIGNALS would be connected as illustrated, or it could be placed in the peripheral device, in which case the DEVICE SIGNALS would be connected and communicated to the device controller 14.

The state decoder unit, in light of the fact that there are five separate signals applied thereto (three, forming the CONTROL SIGNALS, and two forming the DEVICE SIGNALS), is capable of producing therefrom 32 separate state identifications. Only ten, however, are actually used. Thus, the remaining signals are applied to an EXCLUSIVE-OR circuit configuration 44 to produce an ILLEGAL STATE signal, thereby checking the state decoder unit 34.

We claim:

1. A method of monitoring proper operation of as state machine means operable to assume one of a number of digital states, each assumed digital state being indicative of a immediately prior assumed digital and receipt of an input signal produced by a digital means, the state machine means generating control signals for controlling, at least in part, operation of the digital means, the method comprising the steps of:

emulating the digital means by receiving the control signals to produce therefrom an emulated input signal representative of the input signal;

comparing emulated input signal and the control signals in a manner that determines whether the control signals are correct; and producing an error signal in the event the comparing step determines the control signal are not correct.

2. In a data processing system having processing means, a peripheral device and device controller means operable to control data transfers between the peripheral device and the processing means, the device controller means and the peripheral device each having state machine means for generating handshake signals in response to the handshake signals of the other, apparatus for monitoring proper operation of the device controller means state machine means, the apparatus comprising:

emulator state machine means coupled to receive the device controller means handshake signals for emulating the peripheral device state machine means to generate emulated peripheral device handshake signals; and compare means coupled to receive the device controller means and peripheral device handshake signals for determining that the present device controller means handshake signals are correct, the compare means including means for generating an error signal when it is found from said comparison that the device controller means handshake signals are not correct.

3. In a data processing system, including a first data station and a second data station coupled to one another for data communication therebetween, the first and second data stations each having control means operable to generate control signals and to receive response signals from the other of the control means, each of the control means comprising:

first state machine means operably coupled to receive the response signals from the other of the control means for sequentially assuming each of a number of digital states and produce therefrom the control signals;

emulator state machine means coupled to the logic means to receive the control signals produced by the first state machine means for emulating the other state machine means of the other data station to produce emulated response signals that are substantially the same as the response signals of the other control means; and means for comparing the emulated response signals and the control signals for producing an error signal in the event of detected erroneous operation.

4. In a digital system, including a first and a second state machine means each operable to sequence through first and second numbers of digital states, respectively, the first state machine means being configured to produce control signals in response to receipt, at least in part, of response signals produced by the second state machine means, apparatus for checking proper operation of the first state machine, the apparatus comprising:

third state machine means coupled to receive the control signals and operable to sequence through a plurality of digital states to emulate the second state machine means and to produce emulated response signals that are substantially identical to the response signals produced by the second control signals; and means for comparing the control and the emulated response signals for producing therefrom a error signal when improper operation of the first state machine means is detected.

5. The apparatus of claim 4, wherein the plurality of digital states is equal to the second number of digital states assumed by the second state machine means.

6. The apparatus of claim 5, wherein each digital state assumed by the third state machine means is substantially the same as that assumed by the second state machine means.

7. The apparatus of claim 4, wherein the first and third state machine means each include a plurality of digital stages, and wherein each digital state assumed by the first and the third state machine means is represented by a one of the digital stages of each of the first and the third state machine means being set to a first digital state, and the remaining digital stages being set to another digital state.

8. The apparatus of claim 7, wherein the comparing means includes means for detecting parity.

* * * * *